United States Patent [19]

Duan

[11] Patent Number: 4,781,978
[45] Date of Patent: Nov. 1, 1988

[54] ARTICLES HAVING A COATING FORMED FROM A POLYMERIC BLEND

[75] Inventor: Daniel C. Duan, St. Paul, Minn.

[73] Assignee: Minnesota Mining and Manufacturing Company, St. Paul, Minn.

[21] Appl. No.: 22,323

[22] Filed: Mar. 2, 1987

[51] Int. Cl.$^4$ .......................... B32B 27/00; G02B 1/04
[52] U.S. Cl. ...................................... 428/383; 428/412; 428/419; 428/422; 428/483; 428/518; 428/458; 428/463; 428/464; 428/431; 428/437; 428/442; 428/439; 428/331; 428/328; 428/516; 428/520; 351/160 H; 427/40; 427/41; 427/307
[58] Field of Search ............... 428/383, 412, 483, 419, 428/518, 520, 422; 427/216, 221, 222

[56]  References Cited
U.S. PATENT DOCUMENTS 3,976,490  8/1976  Macleish ................................ 96/84
4,300,820 11/1981  Shah ..................................... 351/160
4,369,229  1/1983  Shah ..................................... 428/421
4,462,665  7/1984  Shah ..................................... 351/160
4,642,267  2/1987  Creasy et al. ........................ 428/413
4,686,118  8/1987  Arai et al. ............................ 427/261

FOREIGN PATENT DOCUMENTS 673646  7/1979  U.S.S.R. .

Primary Examiner—P. C. Ives
Attorney, Agent, or Firm—Donald M. Sell; David L. Weinstein

[57]  ABSTRACT

Article comprising a substrate bearing an optically clear, non-crosslinked coating formed from a blend comprising at least one polymer containing carbonylamido functional groups and at least one hydrophobic polymer substantially free of acidic functional groups.

The coating is useful for promoting adhesion, increasing the hydrophilicity of the surface of the article, and increasing receptivity of the substrate for aqueous based inks.

29 Claims, No Drawings

ARTICLES HAVING A COATING FORMED FROM A POLYMERIC BLEND

BACKGROUND OF THE INVENTION

1. Field of the Invention

The present invention relates to articles comprising a substrate bearing a coating formed of blends of polymers.

2. Discussion of the Prior Art

The utilitarian aspects of many articles which have the desired properties of durability, strength, optical clarity, etc. can be adversely affected by the surfaces of those articles. As one example, lenses made of glass or polycarbonates have surfaces that, upon encountering moist air, can fog up, impairing the transparency of the lenses. U.S. Pat. Nos. 4,369,229 and 4,462,665 describe the use of optically clear polymer blends comprising vinyl lactam polymers and water-insoluble copolymers of a hydrophobic, water-insoluble ethylenically unsaturated monomer, an ethylenically unsaturated monomer containing an acid group, and optionally a hydrophilic ethylenically unsaturated monomer free from acidic groups as coating materials for water insensitive substrates. The hydrophobic polymer requires a monomeric component containing an acidic group. Acidic groups are known to catalyze many chemical reactions, some of which could limit the usefulness of the coated product. Coatings derived from the blends of this invention have a potential pH sensitivity, particularly under highly alkaline conditions, because of the presence of the acidic functional groups. In the area of medical applications, acid groups could cause protein deposition, which may be undesirable for biocompatibility. Moreover, the polymeric blend requires components that are not readily available.

As another example, polyester film, a preferred backing for tapes and magnetic media, exhibits poor adhesion to most other polymers, thus making it difficult to take advantage of the desirable physical properties of polyester. Several techniques, including corona discharge, electron bombardment, treatment with phenolics, or priming with copolymers of vinylidene chloride, have been used to modify polyester films to improve adhesion. However, many of these techniques require expensive equipment and frequently are of limited versatility.

It would be desirable to develop a coating material that has wide utility, e.g. for providing hydrophilicity to hydrophobic surfaces, for priming surfaces to promote adhesion.

SUMMARY OF THE INVENTION

The present invention provides articles comprising a substrate bearing an optically clear, non-cross-linked coating formed from a blend of at least one polymer containing a carbonylamido functional group and at least one hydrophobic polymer substantially free of acidic functional groups, e.g. carboxylic acid, sulfonic acid groups. Properties of the coating can be easily controlled by varying the ratio of carbonylamido group containing polymer and hydrophobic polymer in the blend, by varying the thickness of the coating formed from a given blend, or by varying both the ratio of polymers in the blend and the thickness of the coating formed from the blend. For example, by simply varying the ratio of polymers in the blend, the surface properties of the resulting coating can be changed from hydrophilic to hydrophobic in a continuous manner. No cross-linking steps are required to cure the coatings, thereby making it easy to apply them to various substrates. Another advantage of the coating is that it can be prepared from readily available polymers.

The coatings of this invention are useful for promoting adhesion between the substrate and additional layers, increasing the hydrophilicity of the surface of the substrate, and increasing receptivity of the substrate for aqueous based inks.

DETAILED DESCRIPTION

The term "carbonylamido group containing polymer", as used herein, is a polymer which contains amide groups

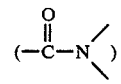

wherein no hydrogen atoms are bonded to the nitrogen atom. A "hydrophobic" polymer may be defined as a polymer which is substantially insoluble in and will not swell appreciably in water.

Carbonylamido group containing polymers that are useful for preparing the blends from which the coatings of the present invention are prepared contain dialkyl-substituted carbonylamido moieties. These polymers include homopolymers, i.e. polymers derived from one specific monomer, and copolymers, i.e. polymers derived from two or more specific monomers. Representative examples of carbonylamido group containing polymers that are useful in this invention are illustrated by the following examples.

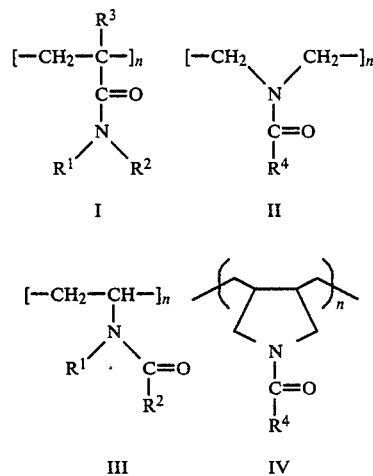

where
- $R^1$ and $R^2$ independently represent alkyl groups, preferably having from one to eight carbon atoms, more preferably having from one to three carbon atoms, or $R^1$ and $R^2$ together can be represented by $(-CH_2-)_x$ where x represents an integer, preferably from two to five, or $R^2$ can be hydrogen provided that it is bonded to a carbon atom,
- $R^3$ represents hydrogen or alkyl group, preferably having from one to six carbon atoms, more preferably hydrogen or methyl group, and $R^4$ represents hydrogen or alkyl group, preferably having from one to eight carbon atoms, more preferably having from one to three carbon atoms, If $R^1$, $R^2$, $R^3$, or $R^4$ is an alkyl group, it can be unsubstituted or substituted. If substituted, the nature of the substituents is not critical so long as the blend derived from the polymer is optically clear.

Representative examples of polymers having dialkyl-substituted carbonylamido moieties and that are suitable for this invention include poly(N-vinylpyrrolidone), poly(N,N-dimethyl acrylamide), poly(methyloxazoline), poly(ethyloxazoline), poly(N-vinyl caprolactam), poly(N-vinyl valerolactam) and poly(N-vinyl-N-methylacetamide). The carbonylamido functional group

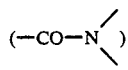

should comprise from about 20% to about 60% of the weight of the carbonylamido group containing polymer.

Hydrophobic polymers that are useful for preparing the blends of which the coatings of the present invention are comprised are substantially free from acidic functional groups as a component of the repeating unit of the polymer. However, trace quantities of acidic functional groups may be present as chain ends or as impurities. It is preferred that the hydrophobic polymers of this invention contain no more than about 1% by weight of acidic functional groups as impurities.

Representative examples of hydrophobic polymers that are suitable for this invention include poly(vinyl chloride) and copolymers thereof, poly(benzyl methacrylate), poly(phenyl methacrylate), poly(vinyl cinnamate), poly(acrylonitrile) and copolymers thereof, poly(vinylidene fluoride), polyesters, phenoxy resins, polysulfone resins, poly(vinyl formal), poly(vinyl butyral), polyimides, cellulose acetate, and polycarbonates, e.g. bisphenol A polycarbonate.

Polymeric blends from which the coatings of the articles of this invention are formed can comprise from about 5 to about 99 parts by weight carbonylamido group containing polymer and from about 95 to about 1 part by weight hydrophobic polymer. Preferably, the blends comprise from about 40 to about 95 parts by weight carbonylamido group containing polymer and from about 60 to about 5 parts by weight hydrophobic polymer.

Other materials, including polymers, can be added to the blends from which the coatings of this invention are derived. Filled coatings based on the blends of the present invention may or may not be optically clear, depending on the application and the filler material. Examples of additives suitable for this invention include, but are not limited to, silica, titanium dioxide ($TiO_2$), polymeric particles, talc, etc.

Unfilled coatings formed from the polymeric blends of this invention should be optically clear. A coating is deemed to be optically clear if its haze value is no greater than 10%, as measured on Gardner Hazemeter, Model XL 211 when the thickness of the coating is approximately 0.5 mil. A convenient method for evaluating optical clarity of a given coating is to cast a thin film of the polymer blend on a transparent substrate from a solution (approximately 10% solids), dry the coating in the absence of atmospheric moisture to remove the solvent, and measure the haze value. Not all combinations of carbonylamido group containing polymers and hydrophobic polymers will form the optically clear blends required for the present invention. A useful criterion for identifying candidate polymer combinations is to select polymer combinations which have solubility parameters in relatively close proximity to each other. Optically clear blends are most typically formed from polymer components having their solubility parameters within 2 (joules/cm$^3$)$^{\frac{1}{2}}$ of each other.

The coatings of the present invention acquire their integrity without cross-linking. In one embodiment, coated articles of the invention are prepared simply by evaporating a solvent carrier of the polymer blend.

Substrates of this invention are preferably water insensitive, and they can be in the form of films, fibers, and varieties of shaped articles. However, the substrates are not required to be water insensitive. As used herein, "water insensitive" refers to an article, the properties of which are not affected by water. For example, water insensitive substrates do not absorb appreciable amounts of water, become tacky upon exposure to water, or become distorted in the presence of water. They can be organic such as, for example, polyesters, e.g. polyethylene terephthalate, polyolefins, e.g. polyethylene, polypropylene, vinyl polymers, e.g. polyvinyl chloride, or inorganic, such as, for example, glass, ceramic materials, and metals. Optionally, the substrate can be primed by techniques such as plasma treatment, corona discharge treatment, sputter etching, chemical priming, and the like to improve the adhesion of the polymeric blend to the substrate.

The surface properties of the coated articles of the present invention can be systematically varied over essentially the total range of hydrophilicity and hydrophobicity associated with the components of the blend. Thus, if a highly water wettable surface is desired, a higher proportion of the carbonylamido group containing polymer should be used in the blend, and if a hydrophobic surface is desired, a higher proportion of the hydrophobic polymer should be used. A continuum of surface properties can be prepared from the same blend components simply by changing their relative proportions. Additionally, thicker coatings of the polymer blend will allow the coated article to accept a higher level of solvent from, for example, an ink jet printer, and still have a very rapid dry time. Moreover, selected coatings of this invention can be used to improve the adhesion between various polymeric coatings and the substrate to which they are coated. For example, they can be used to improve adhesion between polycarbonate and a polyester substrate.

The coatings can be used to provide a non-fogging essentially hydrophilic layer over a normally hydrophobic substrate. For example, glass lenses having their surfaces treated with selected polymeric blends of this invention will remain transparent even in the presence of moist air because the moisture will spread over the entire surface of the lens rather than condensing in small droplets which scatter light. The coatings can be used to provide a surface to a polymeric film that will render the surface amenable to receiving aqueous-based inks.

The articles of this invention can be prepared by any of several methods. Solutions of the polymeric blends can be coated onto the substrate. If this method is used, all of the polymers of the blend should be capable of dissolving in the coating solvent. Solvents that are suitable for preparing the articles of this invention include, but are not limited to mixtures comprising ketones and alcohols, and polar aprotic solvents such as N,N-dimethyl formamide (DMF), N,N-dimethyl acetamide (DMAC), N-methyl pyrrolidone (NMP), cyclopentanone, nitromethane, and pyridine. Alternatively, appropriate polymer/monomer blend combinations can be coated on a substrate and the monomer subsequently polymerized to produce optically clear, non-crosslinked coatings of blends of carbonylamido containing polymer and hydrophobic polymer. As still other alternatives, polymer blends can be extruded onto the surface of the substrate or a sheet of the polymer blend can be laminated to the substrate by heat.

The following, non-limiting examples will further illustrate the present invention.

EXAMPLE 1

Solutions for preparing the coatings of this example were prepared by first forming mixtures containing approximately 2.5% by weight of hydrophobic polymer and carbonylamido group containing polymer in N,N-dimethylformamide. The resulting mixtures were then agitated at room temperature until homogeneous solutions were obtained. The identity and weight ratio of each polymer in each run are set forth in Table I below.

TABLE I

| Run | Carbonylamido group containing polymer | Hydrophobic polymer | Ratio of carbonylamido group containing polymer to hydrophobic polymer (wt./wt.) |
|---|---|---|---|
| 1 | Poly(N—vinyl pyrrolidone)[1] | Polyester[2] | 95/5 |
| 2 | Poly(N—vinyl pyrrolidone)[1] | Polyester[2] | 90/10 |
| 3 | Poly(N—vinyl pyrrolidone)[1] | Polyester[2] | 85/15 |
| 4 | Poly(N—vinyl pyrrolidone)[1] | Polyester[2] | 80/20 |
| 5 | Poly(N—vinyl pyrrolidone)[1] | Polyester[2] | 70/30 |
| 6 | Poly(N—vinyl pyrrolidone)[1] | Polyester[2] | 60/40 |
| 7 | Poly(N—vinyl pyrrolidone)[1] | Phenoxy resin[3] | 80/20 |
| 8 | Poly(N—vinyl pyrrolidone)[1] | Phenoxy resin[3] | 50/50 |
| 9 | Poly(N—vinyl pyrrolidone)[1] | Aromatic polysulfone[4] | 80/20 |
| 10 | Poly(N—vinyl pyrrolidone)[1] | Aromatic polysulfone[4] | 50/50 |
| 11 | Poly(N—vinyl pyrrolidone)[1] | Cellulose Acetate[5] | 80/20 |
| 12 | Poly(N—vinyl pyrrolidone)[1] | Cellulose Acetate[5] | 50/50 |
| 13 | Poly(N—vinyl pyrrolidone)[1] | Polyvinyl butyral[6] | 80/20 |
| 14 | Poly(N—vinyl pyrrolidone)[1] | Polyvinyl butyral[6] | 50/50 |

[1] Available from Aldrich Chemical Co., Inc., molecular weight = 360,000
[2] "Vitel PE-100", a condensation polymerized polyester substantially formed from ethylene glycol, isophthalic acid, and terephthalic acid, available from The Goodyear Tire and Rubber Company
[3] "Phenoxy PKHJ", a polyhydroxyether of bisphenol A, available from Union Carbide Corp.
[4] "Udel P-1700", a bisphenol-A-based polysulfone, available from Union Carbide Corp.
[5] 2.2 acetate groups per ring
[6] #511, available from Scientific Polymer Products, 19% hydroxyl content The solutions described in Table I were coated on unprimed, biaxially oriented polyethylene terephthalate (PET) film in a dry atmosphere by applying a thin layer of the solution on the PET film and then allowing them to dry. All the resultant coated articles were optically clear. All of the articles could be written on with a felt tip pen. The felt tip pen could not write on uncoated polyethylene terephthalate. All attempts to remove the coatings from the PET film of Runs 1–6 by cross-hatching with a razor blade and subsequently applying and then removing Scotch Brand Magic Mending Tape to the cross-hatched area were unsuccessful. The coated article of Run 4 was exposed to a 2½ day water soak, and the coating remained securely adhered to the polyethylene terephthalate substrate. The article of Run 4 was also readily dyeable with a water solution of Sanford's #580 red stamp pad ink. Untreated polyethylene terephthalate film was resistant to the dye.

EXAMPLE 2

Solutions for preparing the coatings of this example were prepared by first forming mixtures containing approximately 9% by weight poly(N-vinyl pyrrolidone) and "Vitel PE-100" polyester in the solvents indicated in Table II below. The weight ratio of poly(N-vinyl pyrrolidone) to "Vitel PE-100" polyester was 80 to 20. The mixtures were agitated at room temperature until homogeneous solutions were obtained.

TABLE II

| Run | Solvent |
|---|---|
| 15 | N,N—Dimethyl Formamide |
| 16 | N,N—Dimethyl Acetamide |
| 17 | N—Methyl Pyrrolidone |
| 18 | Cyclopentanone |

Articles of this example were prepared by coating each of the four solutions on unprimed, biaxially oriented polyethylene terephthalate (PET) film by means of a #8 Mayer bar and drying the coatings in a circulating air oven at 100° C. for approximately 10 minutes. The resulting articles were optically clear, resisted fogging when exposed to warm moist air, and showed good wetting when written on with a felt tip pen. Uncoated PET control samples fogged on exposure to warm, moist air and could not be written on with a felt tip pen.

EXAMPLE 3

Solutions for preparing the coatings of this example were prepared by first forming mixtures containing approximately 9% by weight of hydrophobic and carbonylamido group containing polymers in N,N-dimethyl formamide. The resulting mixtures were agitated at room temperature until homogeneous solutions were obtained. The blends of each run contained 80% by weight carbonylamido group containing polymer and 20% by weight hydrophobic polymer. The identity of each polymer in each run is set forth in Table III below.

TABLE III

| Run | Carbonylamido group containing polymer | Hydrophobic polymer |
|---|---|---|
| 19 | Poly(N—vinyl pyrrolidone)[1] | Phenoxy resin[2] |
| 20 | Poly(N,N—dimethyl acrylamide) | Phenoxy resin[2] |
| 21 | Poly(ethyl oxazoline)[3] | Phenoxy resin[2] |
| 22 | Poly(N—vinyl-N— | Phenoxy resin[2] |

TABLE III-continued

| Run | Carbonylamido group containing polymer | Hydrophobic polymer |
|---|---|---|
| | methyl acetamide) | |

[1] Available from Aldrich Chemical Co., Inc., molecular weight = 360,000
[2] "Phenoxy PKHJ", available from Union Carbide Corp.
[3] "PEOx 200", available from Dow Chemical Co.

Articles of the invention were prepared by coating the above solutions on polyvinylidine chloride-based copolymer primed, biaxially oriented polyethylene terephthalate film by means of a #8 Mayer bar and drying the coating in a circulating air oven at 100° C. for approximately 10 minutes. The resulting articles were optically clear, resisted fogging when exposed to warm moist air, and showed good wetting when written on with a felt tip pen.

EXAMPLE 4

An eight percent by weight solution of a blend of poly(N-vinyl pyrrolidone) (molecular weight=360,000) and polyvinyl butyral (#511, Scientific Polymer Products, 19% hydroxyl content) in N,N-dimethyl formamide (DMF) was prepared by agitating the polymers in DMF at room temperature until a homogeneous solution was obtained. The blend contained 60% by weight poly(N-vinyl pyrrolidone) and 40% by weight polyvinyl butyral. The resulting solution was coated on a glass plate using a #8 Mayer bar and dried at 100° C. for 10 minutes to produce an optically clear coated composite article which resisted fogging when exposed to warm moist air.

EXAMPLE 5

An eight percent by weight solution of a blend of poly(N-vinyl pyrrolidone) (molecular weight=360,000) and polyvinyl butyral (#511, 19% hydroxyl content, available from Scientific Polymer Products) was prepared by agitating the polymers in N,N-dimethyl formamide at room temperature until a homogeneous solution was obtained. The polymer blend contained 90% by weight poly(N-vinyl pyrrolidone) and 10% by weight polyvinyl butyral. The resulting solution was coated on a glass ophthalmic lens by dipping the lens into the polymer solution. The coated lens was dried at 100° C. for 10 minutes to produce an optically clear composite structure which resisted fogging when exposed to warm moist air.

EXAMPLE 6

A 10 percent by weight solution of a blend of poly(N-vinyl pyrrolidone) (molecular weight=360,000) and phenoxy resin (Phenoxy PKHJ, available from Union Carbide Corp.) was prepared by agitating the polymers in N,N-dimethyl formamide (DMF) at room temperature until a homogeneous solution was obtained. The blend contained 80% by weight poly(N-vinyl pyrrolidone) and 20% by weight phenoxy resin. The resulting solution was coated on a biaxially oriented, corona treated polypropylene film by means of a #8 Mayer bar, and the coating dried at 100° C. for 10 minutes. The resulting article was optically clear and resisted fogging when exposed to warm, moist air. It also showed good wettability when written on with a felt tip pen.

EXAMPLE 7

A 10 percent by weight solution of a blend of poly (N-vinyl pyrrolidone) (molecular weight=360,000) and a polyester ("Vitel PE-200" available from The Goodyear Tire and Rubber Company) was prepared by agitating the polymers in N,N-dimethyl acetamide (DMAC) at room temperature until a homogeneous solution was obtained. The blend contained 70% by weight poly(N-vinyl pyrrolidone) and 30% by weight polyester. The resulting solution was coated on unprimed polyethylene terephthalate film by means of a #18 Mayer bar and dried at 90° C. for 10 minutes to produce an optically clear article. The coated surface of the article showed good wettability when written on with a felt tip pen. Additionally, the coated surface of the composite structure showed excellent adhesion when subjected to the cross-hatch tape strip test described in Example 1.

EXAMPLE 8

Solutions for preparing the coatings of this example were prepared by first forming mixtures containing approximately nine weight percent of carbonylamido group containing polymer and hydrophobic polymer in N,N-dimethyl formamide. The mixtures were agitated at room temperature until homogeneous solutions were obtained. The blends of each run contained 80% by weight carbonylamido group containing polymer and 20% by weight hydrophobic polymer. The identity of each polymer in each blend is set forth in Table IV below.

TABLE IV

| Run | Carbonylamido group containing polymer | Hydrophobic polymer |
|---|---|---|
| 23 | Poly(N—vinyl pyrrolidone)[1] | Polyvinyl chloride copolymer[2] |
| 24 | Poly(N—vinyl pyrrolidone)[1] | Poly(benzyl methacrylate)[3] |
| 25 | Poly(N—vinyl pyrrolidone)[1] | Poly(acrylonitrile)[4] |
| 26 | Poly(N—vinyl pyrrolidone)[1] | Poly(vinyl cinnamate)[5] |
| 27 | Poly(N—vinyl pyrrolidone)[1] | Poly(vinylidene fluoride)[6] |
| 28 | Poly(N—vinyl pyrrolidone)[1] | Poly(vinyl formal)[7] |
| 29 | Poly(N—vinyl-N—methyl acetamide)[8] | Poly(vinyl cinnamate)[5] |
| 30 | Poly(N—vinyl-N—methyl acetamide)[8] | Phenoxy resin[9] |
| 31 | Poly(N,N—dimethyl acrylamide)[10] | Poly(vinylidene fluoride)[6] |
| 32 | Poly(N—vinyl caprolactam)[11] | Poly(phenyl methacrylate)[12] |
| 33 | Poly(ethyl oxazoline)[13] | Phenoxy resin[9] |
| 34 | Poly(ethyl oxazoline)[14] | Phenoxy resin[9] |

[1] Available from Aldrich Chemical Co., Inc., molecular weight = 360,000
[2] "Vinylite VMCH", available from Union Carbide Corp.
[3] #226, available from Scientific Polymer Products
[4] #18131-5, available from Aldrich Chemical Co., Inc.
[5] #18264-8, available from Aldrich Chemical Co., Inc.
[6] "Sole F 5008", available from Solvay & Cie Societe Anonyme
[7] #012, available from Scientific Polymer Products
[8] Laboratory Preparation
[9] "Phenoxy PKHJ", available from Union Carbide Corp.
[10] Laboratory Preparation
[11] Laboratory Preparation
[12] #227, available from Scientific Polymer Products
[13] "PEOx 200", available from Dow Chemical Co.
[14] "PEOx 500", available from Dow Chemical Co.

The above-described solutions were coated on a chemically primed (polyvinylidene chloride copolymer based primer), biaxially oriented polyethylene terephthalate (PET) film by means of a #8 Mayer bar, followed by drying in a circulating air oven at 100° C. for approximately 10 minutes. The resulting coated articles were optically clear and showed good ink receptivity when written on with a felt tip pen.

EXAMPLE 9

An approximately seven percent by weight solution of a blend of poly(N-vinyl pyrrolidone) (molecular weight=360,000) and a polyester ("Vitel PE-100", available from Goodyear Tire & Rubber Co.) was prepared by agitating the polymers in N,N-dimethyl acetamide, with heating, until a homogeneous solution was obtained. The blend contained 80% by weight poly(N-vinyl pyrrolidone) and 20% by weight polyester. The solution was coated on unprimed biaxially oriented polyethylene terephthalate (PET) film (approximately 15 cm wide) in a continuous extrusion coating process (approximately 26 micrometers wet coating thickness, approximately 1.7 micrometers dry coating thickness), and the coated film was dried at about 110° C. for three minutes. The dried, primed PET film was then coated with solutions containing the polymers and solvents set forth in Table V. The coating operation was carried out in a glove bag under a nitrogen atmosphere. The coated film samples were retained in the glove bag until the solvent has evaporated. Just prior to coating, the primed film samples were heated to 110° C. and then cooled to ambient conditions in a dry atmosphere. All of the coating solutions in Table V contained approximately 9% solids. Adhesion of the coating was evaluated by the tape strip test described in Example 1.

TABLE V

| Run | Polymer | Solvent | Adhesion Test |
|---|---|---|---|
| 35 | Phenoxy[1] | Mesityl Oxide | Slight Failure[2] |
| 36 | Phenoxy[1] | Dioxane | No Failure |
| 37 | Phenoxy[1] | Tetrahydrofuran | Slight Failure[2] |
| 38 | Cellulose Acetate[3] | Dioxane | No Failure |
| 39 | Cellulose Acetate[3] | Acetone | No Failure |
| 40 | Cellulose Acetate[3] | Tetrahydrofuran | Slight Failure[2] |
| 41 | Sulfone[4] | Dioxane | No Failure |
| 42 | Sulfone[4] | Tetrahydrofuran | No Failure |
| 43 | Polycarbonate[5] | Tetrahydrofuran | No Failure |

[1]"Phenoxy PKHJ", available from Union Carbide Corp.
[2]Very small isolated areas of failure
[3]2.2 acetate groups per ring
[4]"Udel P-1700", available from Union Carbide Corp.
[5]Bisphenol A polycarbonate, available from Polysciences, Cat. #0962

Control samples consisting of coatings of each of the above polymer solutions on unprimed PET film from the same roll stock used to prepare the above examples showed consistently poor adhesion, ranging from spontaneous separation from the PET film to essentially complete failure in the tape strip test.

EXAMPLE 10

A solution containing approximately five percent by weight solids of a blend of poly(N-vinyl pyrrolidone) (molecular weight=360,000) and cellulose acetate (2.2 acetate groups per ring) was prepared by agitating the polymers in the indicated solvent mixtures at room temperature until a homogeneous solution was obtained. The polymer blends contained 70% by weight poly(N-vinyl pyrrolidone) and 30% by weight cellulose acetate.

| Run | Solvents | Solvent Ratio |
|---|---|---|
| 44 | acetone/methanol | 3/1 |
| 45 | acetone/isopropanol | 3/1 |

The resulting solutions were coated on biaxially oriented polyvinylidene chloride copolymer primed polyethylene terephthalate (PET) film using a #8 Mayer bar and the coated samples dried at 53° C. in a circulating air oven. The resulting coated films were optically clear and could be written on by a felt tip pen.

EXAMPLE 11

An approximately 10 percent by weight solution of a blend of poly(N-vinyl pyrrolidone) (molecular weight=360,000) and polysulfone ("Udel P 1700", available from Union Carbide Corp.) in N,N-dimethyl formamide (DMF) was prepared by agitating the polymers in DMF at room temperature until a homogeneous solution was obtained. The weight ratio of poly(N-vinyl pyrrolidone) to polysulfone was 80 to 20. The resulting solution was coated on a piece of 2 mm thick polysulfone sheet ("Udel 1700", available from Union Carbide) using a #8 Mayer bar and the coated sheet dried in a circulating air oven at 100° C. for 15 minutes. The dried coated sheet was easily written on with a felt tip pen. An uncoated control sample of the polysulfone sheet could not be written on with the felt tip pen. The coating was not removed by the tape strip test described in Example 1. Additionally, the coating showed excellent adhesion to the film after a 15 minute water soak.

This example demonstrates an article wherein the substrate is made of the same material as the hydrophobic component of the blend. It is important to note that the coated sheet retained its optical clarity and that the coating adhered to the sheet under the severe soak test. It was unexpected that the coated substrate would retain its optical clarity, because the solvent used to prepare the blend would normally be expected to attack the sheet and possibly have an adverse effect on its optical clarity.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Article comprising a substrate having an optically clear, non-crosslinked coating comprising at least one polymer comprising carbonylamido functional groups, at least one of said carbonylamido functional groups represented by the structure

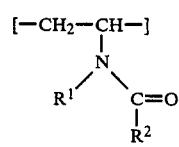

where
R[1] and R[2] independently represent alkyl groups, or R[1] and R[2] together can be represented by (—CH₂—)$_x$ where x represents an integer, or R[2] can be hydrogen, and at least one hydrophobic polymer substantially free of acidic functional groups, said hydrophobic polymer being selected from the group consisting of polyesters having aromatic groups therein and bisphenol A-based polysulfone resins.

2. Article according to claim 1 wherein said coating comprises from about 5 to about 99 parts by weight carbonylamido group containing polymer and from about 95 to about 1 part by weight hydrophobic polymer.

3. Article according to claim 1 wherein $R^1$ represents an alkyl group having from 1 to 8 carbon atoms.

4. Article according to claim 3 wherein $R^1$ represents an alkyl group having from 1 to 3 carbon atoms.

5. Article according to claim 1 wherein $R^2$ represents an alkyl group having from 1 to 8 carbon atoms.

6. Article according to claim 5 wherein $R^2$ represents an alkyl group having from 1 to 3 carbon atoms.

7. Article according to claim 1 wherein x is an integer from 2 to 5, inclusive.

8. Article according to claim 1 wherein said carbonylamido group containing polymer is selected from the group consisting of poly(N-vinyl pyrrolidone), poly(N-vinyl valerolactam), poly(N-vinyl caprolactam), and poly(N-vinyl N-methyl acetamide).

9. Article according to claim 8 wherein said carbonylamido group containing polymer is poly(N-vinyl pyrrolidone).

10. Article according to claim 1 wherein said hydrophobic polymer is a polyester.

11. Article according to claim 10 wherein said polyester is a condensation polyester.

12. Article according to claim 11 wherein said polyester is substantially derived from ethylene glycol, isophthalic acid, and terephthalic acid.

13. Article according to claim 10 wherein said polyester comprises poly(phenyl methacrylate).

14. Article according to claim 10 wherein said polyester comprises poly(benzyl methacrylate).

15. Article according to claim 1 wherein said hydrophobic polymer is a polysulfone.

16. Article according to claim 1 wherein the carbonylamido functional group comprises from about 20% to about 60% by weight of the carbonylamido group containing polymer.

17. Article according to claim 1 wherein said substrate comprises an organic polymeric material.

18. Article according to claim 17 wherein said polymeric material is water insensitive.

19. Article according to claim 17 wherein said polymeric material comprises a polyester.

20. Article according to claim 1 wherein said substrate comprises an inorganic material.

21. Article according to claim 20 wherein said inorganic material is water-insensitive.

22. Article according to claim 1 wherein said substrate is a fiber.

23. Article according to claim 1 wherein said substrate is a film.

24. Article according to claim 1 wherein said substrate is a shaped article.

25. Article according to claim 24 wherein said substrate is a lens.

26. Article according to claim 1 wherein an additional layer is applied over said optically clear, non-crosslinked coating.

27. Article comprising a substrate having an optically clear, non-crosslinked coating comprising at least one polymer comprising carbonylamido functional groups, at least one of said carbonylamido functional groups represented by the structure

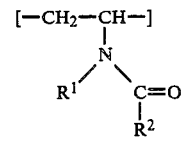

where
$R^1$ and $R^2$ independently represent alkyl groups, or $R^1$ and $R^2$ together can be represented by $(-CH_2-)_x$ where x represents an integer, or $R^2$ can be hydrogen,
and at least one hydrophobic polymer substantially free of acidic functional groups, said hydrophobic polymer being selected from the group consisting of polyesters having aromatic groups therein and bisphenol A-based polysulfone resins and further containing a filler.

28. Article according to claim 27 wherein x is an integer from 2 to 5, inclusive.

29. A process for preparing the article of claim 1 comprising the steps of:
(a) preparing a solution comprising a blend of said carbonylamido group containing polymer and said hydrophobic polymer,
(b) applying said solution to said substrate, and
(c) drying said solution.

* * * * *